(12) United States Patent
Champion et al.

(10) Patent No.: US 9,663,390 B2
(45) Date of Patent: May 30, 2017

(54) REDUCTION OF HYDROGEN SULFIDE AND/OR MALODOR GASSING FROM WATER VIA THE ADDITION OF PEROXYACETIC ACID/HYDROGEN PEROXIDE PRODUCT

(71) Applicant: ECOLAB USA INC., St. Paul, MN (US)

(72) Inventors: Gary L. Champion, Leawood, KS (US); Victor Keasler, Richmond, TX (US); Robert J. Ryther, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 123 days.

(21) Appl. No.: 14/665,839

(22) Filed: Mar. 23, 2015

(65) Prior Publication Data
US 2015/0197438 A1    Jul. 16, 2015

Related U.S. Application Data

(63) Continuation-in-part of application No. 13/891,908, filed on May 10, 2013, now Pat. No. 8,992,780.

(60) Provisional application No. 62/043,559, filed on Aug. 29, 2014.

(51) Int. Cl.
*C02F 3/00* (2006.01)
*C02F 1/72* (2006.01)
*C02F 101/10* (2006.01)

(52) U.S. Cl.
CPC .............. *C02F 1/722* (2013.01); *C02F 1/725* (2013.01); *C02F 3/006* (2013.01); *C02F 2101/101* (2013.01); *C02F 2101/40* (2013.01); *C02F 2209/36* (2013.01); *C02F 2303/02* (2013.01); *C02F 2303/08* (2013.01); *C02F 2305/026* (2013.01); *Y02W 10/15* (2015.05); *Y10S 210/916* (2013.01)

(58) Field of Classification Search
None
See application file for complete search history.

(56) References Cited

U.S. PATENT DOCUMENTS 6,015,536 A    1/2000    Lokkesmoe
7,160,712 B2   1/2007    Christiansen
(Continued)

FOREIGN PATENT DOCUMENTS

EP    0 882 778 A3    12/1998
JP    2001300545 A    10/2001
WO    2011134010 A1   11/2011

*Primary Examiner* — Chester Barry
(74) *Attorney, Agent, or Firm* — McKee, Voorhees & Sease, PLC

(57) ABSTRACT

The invention provides methods and compositions for reducing the malodorous sulfide gas released by a wastewater treatment system. The method preserves the vitality of waste consuming organisms within the system. The method comprises the steps of: determining the SRP PAA demand of the system, determining the aerobic PAA demand of the system, and adding a composition in an amount such that it is in excess of the SRP PAA demand but is below the aerobic PAA demand. Even though the composition increases the amount of sulfates within the wastewater it reduces the amount of SRP which prevents the malodorous sulfite gas release. The composition comprises at least one percarboxyacid.

19 Claims, 3 Drawing Sheets

(56) References Cited

U.S. PATENT DOCUMENTS

| | | | |
|---|---|---|---|
| 7,790,032 B2 * | 9/2010 | Ogden | C02F 3/32 |
| | | | 210/602 |
| 2009/0242461 A1 | 10/2009 | Eldin et al. | |
| 2010/0160449 A1 | 6/2010 | Rovison | |
| 2011/0049061 A1 | 3/2011 | Hale | |
| 2012/0012506 A1 | 1/2012 | Compton et al. | |
| 2012/0012507 A1 | 1/2012 | Compton et al. | |
| 2012/0067782 A1 | 3/2012 | Kaplan et al. | |
| 2012/0237611 A1 | 9/2012 | Sweeny | |
| 2012/0329930 A1 | 12/2012 | Stark et al. | |
| 2013/0337518 A1 * | 12/2013 | Razavi-Shirazi | C02F 3/348 |
| | | | 435/140 |
| 2014/0202954 A1 * | 7/2014 | Lassovsky | C02F 3/327 |
| | | | 210/602 |
| 2014/0326617 A1 * | 11/2014 | Liu | G01N 33/1806 |
| | | | 205/777.5 |
| 2015/0167024 A1 * | 6/2015 | Dorri | C12M 23/34 |
| | | | 435/157 |

\* cited by examiner

REDUCTION OF HYDROGEN SULFIDE AND/OR MALODOR GASSING FROM WATER VIA THE ADDITION OF PEROXYACETIC ACID/HYDROGEN PEROXIDE PRODUCT

CROSS-REFERENCE TO RELATED APPLICATIONS

This application claims priority from provisional application 62/043,559 filed on Aug. 29, 2014 and is a Continuation in part of U.S. patent application Ser. No. 13/891,908 filed on May 10, 2013 now U.S. Pat. No. 8,992,780.

STATEMENT REGARDING FEDERALLY SPONSORED RESEARCH OR DEVELOPMENT

Not Applicable.

BACKGROUND OF THE INVENTION

The invention relates to compositions, methods, and apparatuses for reducing the release of malodorous sulfide gases from water sources. Sulfide gases such as but not limited to DMDS and hydrogen sulfide are malodorous gases whose presence in populated areas are often perceived of as an irritating nuisance. In addition sulfide gases can be explosive, corrosive, and hazardous to health. Most pernicious of all, prolonged contact to sulfide gases can anesthetize one's sense of smell causing the loss of one's ability to detect the presence of other more toxic gases.

This problem is particularly acute when dealing with expelled water from the food processing industry. The food processing industry employs vast quantities of water to create purified food products. Among the food industries with high volumes of water requirements are the sugar cane processing, sugar beet processing, fruit and vegetable processing, meat and poultry processing, grain processing, fat and oil processing, and dairy product processing industries. Unit operations that are most common to the various types of food processing listed above include energy transfer systems, including boiler systems.

In food industries such as the sugar industry, the condensate released by a multiple effect evaporator ("MEE") is an example of a typical expelled fluid. MEE often becomes contaminated and must be disposed of as wastewater. Examples of these contaminating events include steam carry-over, foaming induced by MEE control issues, leaking of sugar thin juice into the stream, or other causes. Contamination is generally comprised of organic salts, inorganic salts, and sucrose. These events are more likely to happen during operation upsets and can cause "sugar shot" (a sudden spike in sugar dosage/concentration in the process fluid). Sugar shots pose particular problems with wastewater disposal as they result in wild variations in microorganisms' populations, diversity, activity, and waste processing capabilities. These wild variations complicate the process of odor management in wastewater.

Unfortunately as described for example in U.S. Pat. No. 7,160,712, malodorous sulfide gases are a common byproduct of waste water treatment. In wastewater treatment microorganisms are used to break down organic (waste) material. Microorganisms accomplish this by utilizing oxygen to oxidize the material as a part of their metabolic functions. Because of its efficiency in microorganism's metabolisms, when available, microorganisms will preferably utilize aerobic processes which require molecular oxygen. When molecular oxygen is less than optimally available, some microorganisms will use anaerobic processes which use other compounds such as nitrates and sulfates. Because nitrates afford superior metabolic efficiency when compared to sulfates, organisms will only use sulfates for oxidation when both nitrates and molecular oxygen are less than optimally available. Sulfate oxidation produces sulfide gases.

Not all organisms are capable or are as capable of utilizing sulfates to metabolize organic material. Organisms that are highly effective at oxidizing or reducing sulfur bearing species (such as sulfates, thiosulfates, and elemental sulfur) are known as SRP (sulfur reducing prokaryotes). A profusion of SRP in a water sample will often result in high releases of sulfide gases. In addition, as SRP proliferate, they tend to strip water supplies of all their oxygen content resulting in highly anaerobic conditions. Once the water becomes anaerobic, the ability of microorganisms to break down organic material drastically slows. As a result a number of legal jurisdictions prohibit the discharge of treated water that contains too little dissolved oxygen. Thus SRP profusion is both a nuisance and makes water disposal difficult.

A number of prior art strategies have been proposed to address the release of sulfide gas. One approach is sulfide scavenging. In sulfide scavenging chemicals are applied to the water which reacts with and traps the sulfide gas before it vaporizes out of the liquid medium. As described in Published US Patent Applications 2012/0012507, 2012/0012506, 2012/0329930, 2012/0067782, 2009/0242461, and European Patent Application EP 0 882 778 A2, scavengers include but are not limited to chlorine, bleach, hydrogen peroxide, potassium permanganate, ferric chloride, hydrogen sulfide, glyoxal, glyoxal-polyamines, alpha-amino ethers, polyaliphatic amines, alkyl-triazines, and nitroxides. Another strategy is sulfate substitution which involves feeding molecular oxygen or nitrates into the water to displace sulfates from being metabolized. And a third strategy as described in U.S. Pat. No. 6,015,536 is to treat the gaseous effluent itself to remove the sulfides.

Unfortunately all of these prior approaches are excessively complex, costly, unreliable, and/or are otherwise unsatisfactory. As a result there remains a clear utility in improved compositions, methods, and apparatuses for reducing the release of malodorous sulfide gases from water sources. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of reducing the odor released by a wastewater treatment system while preserving the vitality of waste consuming organisms within the system. The method comprises the steps of: continuously adding to a process flow of water a composition in an amount such that it is in excess of the SRP PAA demand but is below the aerobic PAA demand, detecting a sudden surge in nutrient content in the process flow of water, and in response to the detected surge adding an effective amount of Fenton's Reagent to the flow. The composition comprises at least one peroxy acid.

The Fenton's Reagent may be added before there is a detectable change in the population of microorganisms in the wastewater treatment system. The Fenton's Reagent may be added before the nutrient surge reaches the wastewater treatment system. The Fenton's Reagent may be added after there is a noticeable increase in odor. The amount of continuously added composition might not be altered in response to the sudden surge in nutrient content. The surge in nutrient content may be detected by measuring fluorescence from the nutrient. The surge in nutrient content might be detected by measuring fluorescence from the nutrient in response to a first excitation light source having a wavelength of 320 nm and a second excitation light source having a wavelength of 406 nm.

The nutrient might be one or more sugars. The process flow might be condensate from a boiler in a sugar mill. The composition might eliminate at least one biofilm layer on at least one surface of the wastewater treatment system and the lack of said biofilm layer might prevent the localization against that surface of at least one of: $H_2S$, a biogenic acid, a corrosive biogenic material, and any combination thereof. The composition might comprise PAA.

The composition may be added in an amount lower than a quaternary ammonium odor suppressant but is more than 10% effective than said quaternary ammonium odor suppressant would be at suppressing sulfide odor release. The aerobic PAA demand of the system may be determined by measuring the minimum ppm amount of composition that needs to be added to cause substantially no less than a 98% drop in total active ATP in the wastewater. The method might exclude the presence of an odor suppressing co-ingredient which neutralizes the innate odor of the peroxy acid. The composition might be fed directly into a portion of the wastewater system selected from the group consisting of: a wastewater pond, an EQ tank, a wastewater storage tank, and any combination thereof. The composition might be fed directly into one item selected from the group consisting of: a trunk line which feeds wastewater into a storage vessel, a stationary water system, a recirculating water system, and any combination thereof. The composition may be fed directly into a covered pond and the composition reduces the amount of sulfide acid corrosion by more than 10% than if the composition were not added to the pond. The composition may reduce oxygen demand of the wastewater. The peracid may be a reaction between a peroxygen source other than hydrogen peroxide with peracetic acid.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
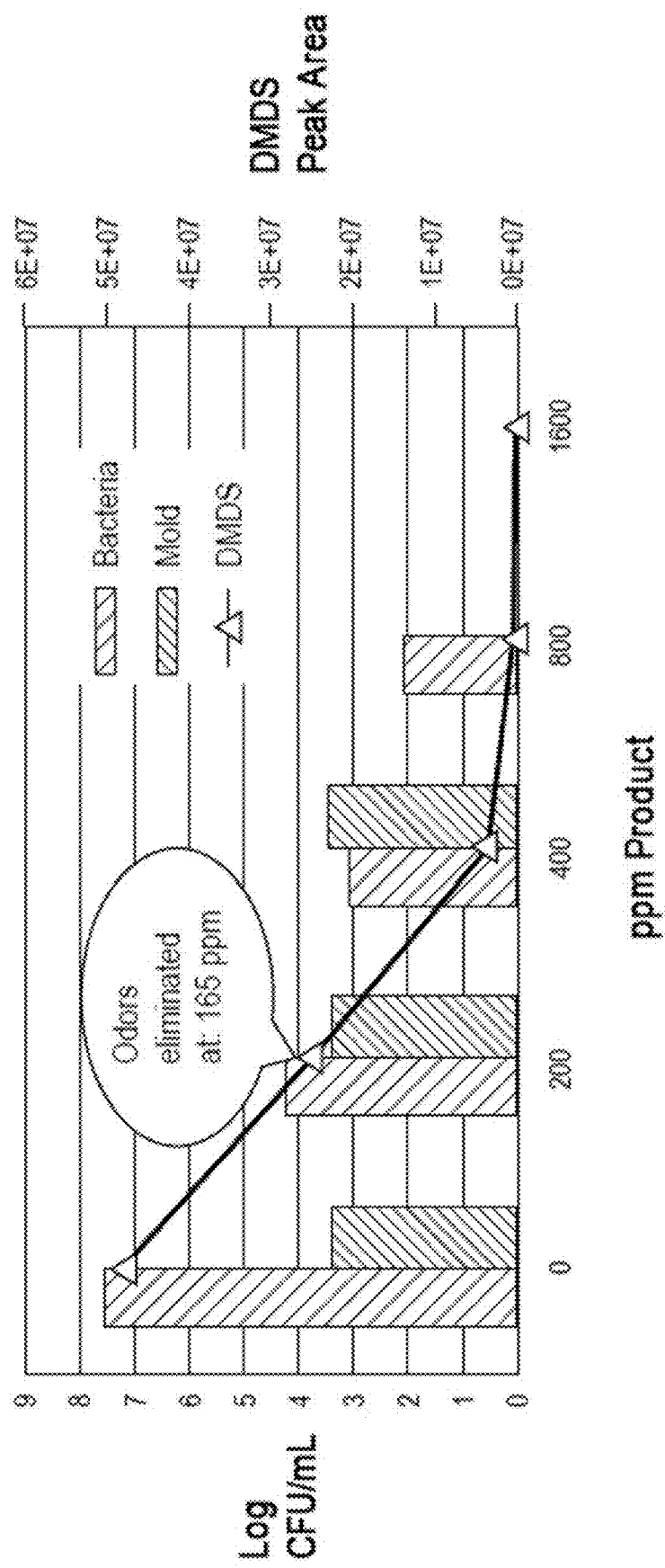
FIG. 1 is a graph demonstrating that the substantial elimination of odor when measured according to a smell test can occur without completely eliminating all microorganisms in a system.

The following definitions are provided to determine how terms used in this application, and in particular how the claims, are to be construed. The organization of the definitions is for convenience only and is not intended to limit any of the definitions to any particular category.

"Fenton's Reagent" means a composition of matter in which hydrogen peroxide and ferrous iron (Fe(II)(+2 valence state)) are in such amounts and under such conditions that hydroxyl radicals, hydroxyl ions, and ferric iron (Fe(III)(+3 valence state)) form or have formed and then at least some react or have reacted to form a superoxide, a proton, and reverts or has reverted the ferric iron back into ferrous iron, it can be characterized as occurring according to the equations:

$$Fe^{2+}+H_2O_2 \rightarrow Fe^{3+}+HO.+OH^- \qquad (1)$$

$$Fe^{3+}+H_2O_2 \rightarrow Fe^{2+}+HOO.+H^+ \qquad (2)$$

In addition a number of secondary and subsequent reactions may occur involving any one, some, or all of these products, reactants, and derivatives thereof, further details regarding Fenton's Reagent and its subsequent reactions are provided in the references: *Fenton Reaction, Controversy Concerning the Chemistry*, by K Barbusinski, Ecological Chemistry and Engineering, Vol. 16, No. 3 pp. 347-358, (2009), *Fenton's Reagent Revisited*, by Cheves Walling, Accounts of Chemical Research, vol. 8, pp. 125-131 (1975), and *Hydrogen Peroxide Catalytic Oxidation of Refractory Organics in Municipal Waste Waters*, by D Bishop et al, Ind. Eng. Chem., Process Design & Development, vol. 7, pp. 1110-117 (1968).

"Consisting Essentially of" means that the methods and compositions may include additional steps, components, ingredients or the like, but only if the additional steps, components and/or ingredients do not materially alter the basic and novel characteristics of the claimed methods and compositions.

"Microorganism" means any noncellular or unicellular (including colonial) organism. Microorganisms include all prokaryotes. Microorganisms include bacteria (including cyanobacteria), Archaea (including sulfate-reducing Archaea), spores, lichens, fungi, molds, protozoa, virinos, viroids, viruses, phages, and some algae. As used herein, the term "microbe" is synonymous with microorganism.

"Mixed" or "mixture" when used relating to "peroxycarboxylic acid composition" or "peroxycarboxylic acids" refer to a composition or mixture including more than one peroxycarboxylic acid, such as a composition or mixture including peroxyacetic acid (PAA) and peroxyoctanoic acid (POOA).

"Objectionable odor," "offensive odor," or "malodor," mean a sharp, pungent, or acrid odor or atmospheric environment from which a typical person withdraws if they are able to. Hedonic tone provides a measure of the degree to which an odor is pleasant or unpleasant. An "objectionable odor," "offensive odor," or "malodor" has an hedonic tone rating it as unpleasant as or more unpleasant than a solution of 5 wt-% acetic acid, propionic acid, butyric acid, or mixtures thereof.

"Peracid" or "Peroxy acid" refer to an acid having the hydrogen of the hydroxyl group replaced by a hydroxy group, oxidizing peracids are referred to herein as peroxycarboxylic acids, peracids also includes the conjugate bases of peracids as well as those species that form in pH environments which alter the pKa of peracids.

"SRP" means sulfur-reducing prokaryotes which are organisms such as those bacteria and archaea that can obtain energy by oxidizing or reducing organic compounds or molecular hydrogen ($H_2$) while oxidizing or reducing sulfur species (including but not limited to sulfates, thiosulfates, and elemental sulfur) often into to hydrogen sulfide ($H_2S$), by doing this SRP can "breathe" sulfur species rather than oxygen, in a form of anaerobic respiration.

"PAA" means peroxyacetic acid a peroxycarboxylic acid with a chemical formula of $CH_3CO_3H$, it is also known by such names as: acetic peroxide, acetyl hydroperoxide, proxitane, and ethaneperoxoic acid. It is often made as an equilibrium product from the reaction between a peroxygen source with peracetic acid.

"PAA Demand" means the minimum dosage of PAA (and/or other peroxy acid) needed to kill substantially all microorganisms in a system, which are susceptible to PAA biocide treatments as well as to completely stoichiometricaly react with all non-biological materials in the system that are oxidation-reduction reactive with peracids in the system such as $H_2S$ and FeS.

"Aerobic PAA Demand" means the minimum dosage of PAA (and/or other peroxy acid) needed to kill substantially all aerobic microorganisms in a system that are susceptible to PAA biocide treatments.

"SRP PAA Demand" means the minimum dosage of PAA (and/or other peroxy acid) needed to kill substantially all SRP microorganisms in a system, which are susceptible to PAA biocide treatments.

"DMDS" means di-methyl di-sulfide, an organic disulfide compound having a chemical formula of $CH_3SSCH_3$, it is flammable and has an unpleasant odor.

"Spectrometry" and "Spectroscopy" means the process of analyzing the interaction between a sample of matter and electromagnetic radiation to determine one or more physical properties of the sample of matter. Forms of electromagnetic radiation used include but are not limited to one or more of microwave, terawave, infrared, near infrared, visible, ultraviolet, x-ray, radiation. The analysis includes measurements of one or more of the radiation's absorption, emission, fluorescence, colorometrics, color changes, reflection, scattering, impedance, refraction, and resonance by the sample of matter.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards treating a water sample bearing SRP which is prone to releasing sulfide gas with an amount of PAA sufficient to substantially prevent the release of sulfide gas but insufficient to reduce the overall microbial population by more than 60% and insufficient to reduce the mold population by more than 10%. In at least one embodiment the method is to determine the aerobic PAA Demand of a system, to determine the SRP PAA Demand of a system and to apply a dosage of PAA to the system that is greater than the SRP PAA Demand but less than the aerobic PAA Demand. Because of the greater oxidation-reduction potential of oxygen based metabolisms over sulfate based metabolisms, many aerobic microorganisms are able to more quickly proliferate and can more easily overcome treatment with a compound such as PAA. In fact in some cases aerobic microorganism can reproduce at a rate of every ~20 minutes while SRP often only reproduce every ~2.5-24 hours. As a result, it is possible to apply PAA in a manner that will substantially sanitize a system of SRP and thereby eliminate the sulfide odor while allowing aerobic waste consuming organisms to survive.

In at least one embodiment one or more peracid bearing compositions are added repeatedly over time to a water sample. Because in each case both the SRP and aerobic microorganism populations are reduced by the composition but the aerobic microorganism population recovers so much faster, after enough additions the SRP population will be substantially eliminated. In at least one embodiment once eliminated, the dosage of peracid needed to suppress a recurrence of SRP after it has been eliminated is less that the initial SRP PAA demand and the dosage added is less than the initial SRP PAA demand.

In at least one embodiment the peracid composition is added to the system according to a batch process. In at least one embodiment the peracid composition is added to the system according to a continuous process.

Compositions comprising one or more peracids such as PAA have been known for use as antimicrobials and bleaching agents. As such, while they have been used in odor control compositions before, their effectiveness in this manner is quite unexpected. PAA is an oxidant in its own right and will convert sulfide back into sulfate. As a result in low dosages, PAA would be expected to make a water environment especially attractive to SRP as it tailors the oxygen supply to be more in their favor.

In addition, the use of low dosage PAA as an odor controller is the opposite of the teachings in the prior art. As described in US Published Patent Application 2010/0022644, PAA is well known as a highly effective biocide but it "suffer[s] from unacceptable odor" Id. As a result when it is used to reduce odor it is part of a strategy of killing off much or all of microorganisms present in an object and it requires the co-presence of an effective amount of an odor suppressant such as amine oxide to counteract the vinegar like odor associated with PAA. This however would be ineffective in a situation such as waste water disposal in which the dosage needs to be less than that required to reduce the microbial population of an object lest the water medium lose the ability to degrade the organic material within the water. In at least one embodiment the dosage of PAA added to the water is insufficient to substantially reduce the water's microbial population. In at least one embodiment an effective amount of an odor suppressant such as but not limited to amine oxide is excluded from being added to the water.

Similarly U.S. Pat. No. 6,015,536 discloses using PAA to reduce odors. There too however it is clear that the potency of PAA in killing microbial organisms is very pronounced. As a result it teaches that to reduce odors PAA is to be added to the gaseous effluent rather than the water medium itself.

In at least one embodiment the Aerobic PAA Demand is determined by the use of a color test. In a color test, equivalent proportions to between 1-50 drops of starch indicator, weak acid, and potassium iodide are added to a 10 ml sample of water, then sodium thiosulfate drops are added one at a time until the sample turns colorless. The aerobic PAA demand is then between 0.1 ppm to 50 ppm per drops needed to effect a color change. Typically, the SRP PAA demand is between ⅕ to ¹⁄₁₀₀,₀₀₀ the aerobic PAA demand. As each wastewater system will have unique conditions based on the specific waste contents, amounts, and the specific SRP and aerobic organisms therein, the SRP PAA demand and aerobic PAA demand can be unique for each system and in fact may change over time. In at least one embodiment the SRP PAA demand and aerobic PAA demand are measured over time and the amount of additive added is modified to remain within the "in between" measurement.

In at least one embodiment an initial dosage is required to make the system inhospitable to SRP, but once that has been accomplished a much lower dosage of additive is required to maintain the absence of SRP and the dosages fed over time are modulated to reflect decreased PAA dosage.

In at least one embodiment different dosages of peracid compositions are measured to determine the specific population of aerobic and SRP populations before and after the addition of the composition. This can be done to produce a function and/or curve indicating the SRP PAA demand and the aerobic PAA demand of the specific water system at a given time. In at least one embodiment the relative populations can be identified using PCR, qPCR or any other equivalent method known in the art. In at least one embodiment the measurement of one or more of the populations before and/or after a sample or the water system itself is treated according to one or more of those methods mentioned in U.S. patent application Ser. Nos. 14/138,526, 13/550,748 and 13/360,238. Measurements such as of total Bacteria, SRP and Archea per ml and qPCR will further speciate and measure SRP per ml. Aliquots of the water sample can be dosed with different concentrations of peracid compositions and the aforementioned testing can be performed on each aliquot. In at least one embodiment the resulting product dosage versus Total Bacteria Count and SRP count curve will allow administration of proper product dosage to satisfy the SRP PAA demand while remaining well below the aerobic PAA demand.

In at least one embodiment the aerobic PAA demand and the SRP PAA demand are determined using a culture-independent enumeration such as quantitative polymerase chain reaction (qPCR). This method allows for the enumeration of specific organism groups (such as sulfate reducing bacteria and sulfate reducing archaea) as well as specific organism genus or species. In short, this method works by collecting a sample, extracting the DNA from all microbes present, amplifying the microbial DNA via PCR, and quantifying the amount of DNA during each PCR amplification cycle by the incorporation of a fluorescing DNA-binding dye. By determining up front the abundance of the aerobic and SRP populations, one can then determine how much peracid is required. The peracid treatment should be sufficient to provide sufficient kill of the SRP population without killing too much of the aerobic population to cause negative impact on the wastewater process.

Figure 2:
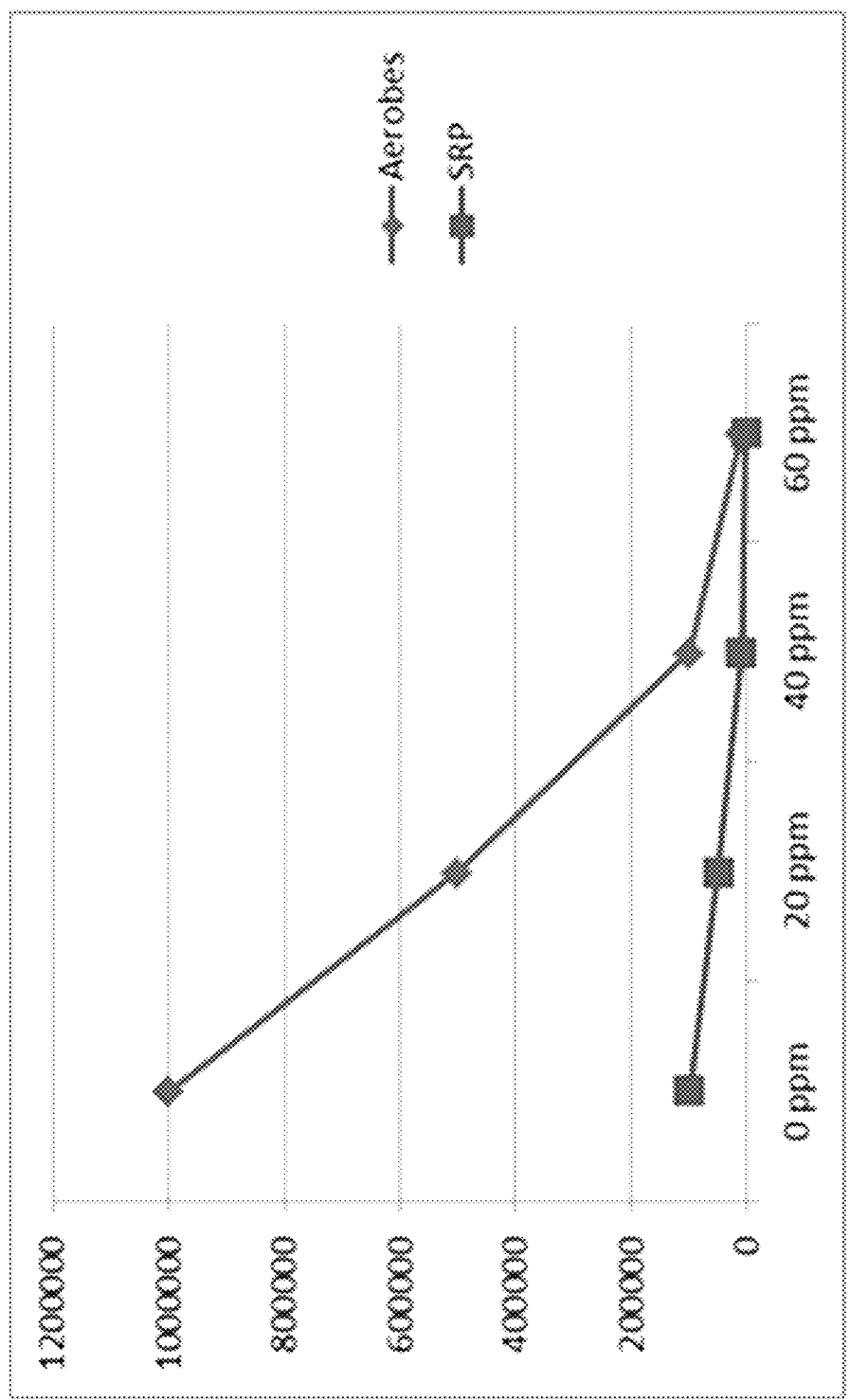
FIG. 2 is a graph demonstrating that adding small dosages of one or more peracids to a waters system eliminates aerobic microorganisms and SRP differently over time.

Referring now to FIG. 2 there is shown a graph of one such example. If we assume that in a given system the aerobe population is 1,000,000 per mL and the SRP population is 100,000 per mL and we perform a PAA demand study to understand the microbial kill efficiency we can then determine how much PAA to add to minimize the SRP population without killing so many aerobes that it is detrimental to the waste water plant. This graph assumes that reduction after treatment may be something like: 50% reduction with a 20 ppm PAA treatment, 90% reduction with a 40 ppm treatment, and 99% reduction with a 60 ppm treatment. The goal of treatment would be to suppress the SPR population as much as possible while still allowing a sufficient number of aerobes to survive and move into the waste process.

In at least one embodiment the peracid composition is added to a point in the wastewater treatment system which is upstream from other further processing steps. In some subsequent steps excess (or substantially any) residual peracid may interfere with that processing, may damage equipment, or may cause unwanted side chemical reactions or may kill off other subsequent biological treatments. In at least one embodiment the low dosage of peracid allows for the use of peracid to effectively suppress odor without so interfering with the subsequent waste treatment steps.

In at least one embodiment the composition contains species from both sides of the equilibrium equation. In at least one embodiment the PAA can be represented according to the structure:

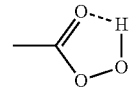

PAA and other peracids often exist in an equilibrium state between an acid (such as acetic acid) and an oxygen donating species (such as a peroxide). The equilibrium at least in part may involve transition between PAA, peroxide, and acetic acid, the relative amounts of PAA, peroxide, and acetic acid present in a given sample of equilibrium PAA may vary based on the specific thermodynamic conditions of the given sample, at any given moment. Equilibrium PAA may comprise 0-100% PAA, 0-100% peroxide, and 0-100% acetic acid, further details of equilibrium PAA and methods of its production are described in the paper: *Peracetic Acid (CAS No. 79-21-0) and its Equilibrium Solutions*, JACC No. 40, pp. 2-3 (2013), and U.S. Pat. No. 7,012,154, as used herein "PAA" and "equilibrium PAA" also include all other per-acid biocides described in U.S. Pat. No. 7,012,154 mutatis mutandis.

PAA typically has a pKa of 8.2. In at least one embodiment the water the peracid composition is added to have a pH of between 6-10 preferably 7-8.5. The peracid may exist in a protonated and/or a non-protonated form. In at least on embodiment the peracid is added to the pH environment and/or is in one or more of the forms described in one or more of U.S. Pat. Nos. 8,114,222 and 8,398,791.

There are a number of compositions and methods of their application relevant to this invention. In at least one embodiment the low dosage composition is applied at a level above the SRP PAA demand level but below the aerobic PAA demand level. Such compositions may include one or more of the chemicals and in particular the peracids and peroxy acids mentioned in any one, some or all of US Published Patent Applications 2012/0172439, 2012/0225943, 2012/0141407, U.S. patent application Ser. No. 11/847,604, and U.S. Pat. Nos. 7,160,712, 6,165,483, 7,816,555, and 6,277,344. Representative examples of how such chemicals are produced and/or dispensed are also described therein.

In at least one embodiment the peracid composition is injected via a pump into the water influent at a predetermined dosage based upon routine microbial testing described above. Active PAA may be measured in the water effluent to confirm that no active PAA is present which indicates that aerobic PAA demand has not been achieved. If the water to be treated is not flowing (holding pond or tank), the peracid may be injected via pump or manually fed into the pond/tank to achieve the desired dosage. In this case, peracid could also be injected via pump into a recirculating stream within the pond/tank to achieve the desired dosage.

Figure 3:
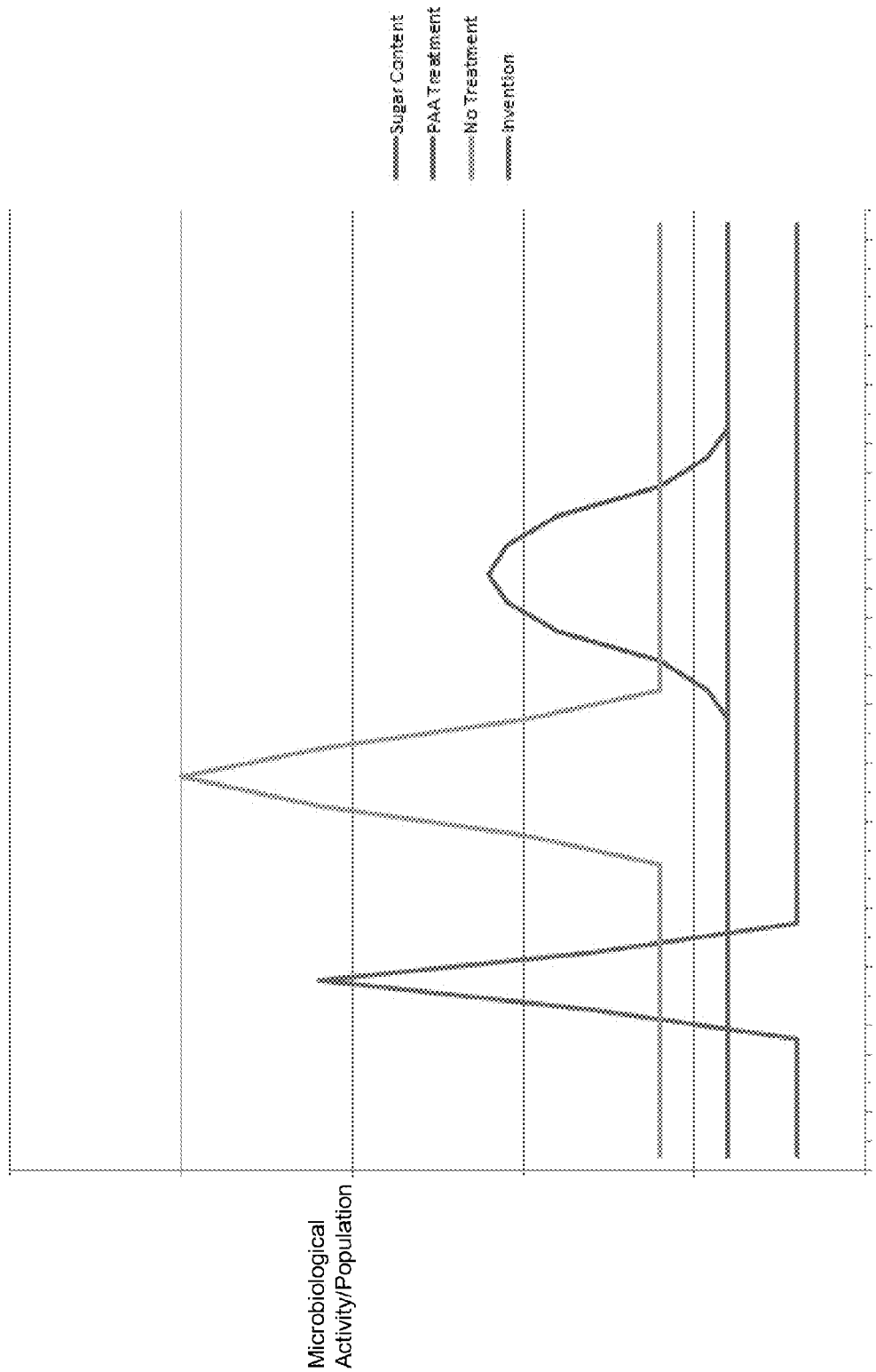
FIG. 3 is a graph demonstrating the use of the invention to address odor control in wastewater streams susceptible to sugar shock/nutrient shock.

Referring now to FIG. 3 there is shown at least one embodiment of the invention which addresses the control of odor releases in water streams (such as wastewater) susceptible to nutrient shock/sugar shock. (As used herein the terms "sugar shock" and "nutrient shock" are used interchangeably mutatis mutandis to describe the same fundamental principal). As shown in the diagram if the process fluid undergoes a nutrient shock (which could be in the form of a sudden jump in the concentration of any microorganism sustaining nutrient and in particular includes a sugar shock) after a particular time lag, in the face of a constant odor control regime, there will often be a corresponding increase in microorganism activity and therefore odor release. FIG. 3 shows that in the absence of any anti-microbial regime, shortly after the shock occurs microbial populations rapidly increase and therefore cause a large increase in odor release.

Representative materials that would give rise to such a nutrient shock of course include sugar but also includes any organic compound(s) that is biologically degradable and/or will provide a food source for odor causing microbes to eat and multiply regardless of the presence or absence of sugar. This includes but is not limited to any form of sugar, honey, sweetener, plant resin, plant syrup, molasses, glucose, mannose, galactose, proteins, meat, meat byproducts, dairy products, dairy waste, food waste, food byproducts, honey, carbohydrates, grains, grain stillage, corn, corn stillage, vegetable oils, fats, lipids, and any food, refined food, food derived byproduct, food derived waste product, and any combination thereof.

FIG. 3 also shows that in the face of an above described constant PAA regime targeted towards the expected steady state of the fluid prior to the shock, after a larger time lag there too will occur an increase in the microbial population. This will also result in a more potent malodorous event.

In at least one embodiment a nutrient shock can be addressed by proportionally increasing the PAA content relative to the change in organism population. Usually PAA preferentially reacts with $H_2S$/sulfide generated by the SRP microbes relative to microbes. As a result it will normally have eliminated much of the $H_2S$/sulfide before having a significant impact on the microbial population. Once the $H_2S$/sulfide has been eliminated it can then go on to kill microbes until active PAA is no longer present. When microbial populations increase proportionately with the increased food source associated with the nutrient shock, a proportionate increase in PAA demand is required.

In at least one embodiment a measurement of active PAA and PAA demand is taken. These measurements allow the operator to determine the extent of the population growth resulting from the nutrient shock and to increase the increase in PAA enough to react to the shock but in a dosage such that no active PAA is available to be harmful to downstream receivers of this treated water.

In at least one embodiment a water flow is treated by an above PAA regimen but in the event of a nutrient/sugar shock, a large dose of mild Fenton's Reagent is added to the system. Fenton's Reagent is a less expensive reactant for use against $H_2S$/sulfide than PAA. As a result by supplementing the PAA with Fenton's Reagent, $H_2S$/sulfide levels can be reduced by the Fenton's Reagent which minimizes the reduction of PAA and therefore frees up more PAA to kill SRP microbes. In at least one embodiment the Fenton's Reagent is added in a dosage of between 0.001 ppm and 1000 ppm.

In at least one embodiment the pH of the water being treated is between 6.8 and 8.2. At this pH, Fenton's Reagent forms highly reactive hydroxyl radicals which are effective at reducing microorganism activity. While it is known to use Fenton's Reagent in wastewater treatment it is often disfavored because the hydroxyl radicals are unstable so a dosage does not provide effective control for long (often as short as or shorter than 12 hours). Worse it is largely ineffective against many forms of bacteria, and it requires pH conditions which are often incompatible with the conditions in effect in many wastewater treatment facilities especially treatment ponds. However in the context of a nutrient shock, because the Fenton's Reagent is only addressing a short term disruption, these limitations are actually beneficial attributes. (They can be targeted to the consequences of the shock, and when the shock ends, they are no longer active). In this way the overall superiority of PAA over Fenton's Reagent for sustained usage can be maintained, but in the event of a sudden shock, Fenton's Reagent can be used in a manner more dynamic than is optimal for PAA.

In at least one embodiment the PAA control regime is supplemented by Fenton's Reagent in the event of a nutrient shock according to a feed forward strategy. In a feed forward strategy the system is constructed and arranged to anticipate a future nutrient shock and to feed the Fenton's Reagent prior to the actual arrival of the increased amount of sugar in the targeted water.

In at least one embodiment the PAA control regime is supplemented by Fenton's Reagent in the event of a nutrient shock according to a feedback strategy. In a feedback strategy the system is constructed and arranged to detect the presence of a nutrient shock and to feed the Fenton's Reagent in reaction to the detected increased amount of sugar in the targeted water. Either or both strategies may make use of any one or more sorts of detectors which would indicate a nutrient shock.

In at least one embodiment a method is used to distinguish between typical "noise" inherent in the slight variations inherent in a generally stable and a significant enough change that can be characterized as a shock. This involves establishing upper and lower bounds of measurements deemed acceptable. When a detected nutrient content is above the upper bounds it is no longer considered noise but considered a shock and the anti-shock treatment is implemented. Similarly the method may involve a sliding scale in which certain measurements are not considered shocks if their frequency of occurrence is low enough but a sudden increase in frequency of such measurements would be indicative of a nutrient shock. This methodology is applicable to any method of measuring the nutrient shock including but not limited to those methods of measurement listed below.

In at least one embodiment the method of detecting the nutrient shock utilizes a spectroscopic detector method. A representative example of spectroscopic detection is described in Patent Document WO 2012/054220 A1. In at least one embodiment a nutrient shock is detected by measuring fluorescence in a fluid. In at least one embodiment the fluorescence is measured in one or more channels in response to an excitation light source at 320 nm and 409 nm and the measurement is correlated to a particular amount of sugar in the fluid.

In at least one embodiment the method of detecting the nutrient shock utilizes an oxidation-reduction potential change in the fluid. A representative example of oxidation-reduction potential change detection of nutrients is described in U.S. Pat. No. 8,130,106.

In at least one embodiment the method of detecting the nutrient shock utilizes a nucleic acid measuring approach. Representative examples of a nucleic acid measuring approach are described in U.S. Pat. No. 8,613,837 and U.S. patent application Ser. No. 14/138,526. In at least one embodiment the approach uses the nucleic acid measurement and/or a diversity index to determine a change in microbial distribution and/or population and correlating that change with an increase in malodorous microorganisms.

In at least one embodiment the method of detecting the nutrient shock utilizes a sulfide or hydrogen sulfide detecting approach. Representative examples of a detecting sulfide or hydrogen sulfide include but are not limited to ASTM D4658, water measurements using Hatch starch/iodide tests, and air measurements using such apparatuses as Draeger tubes, Jerome meters, Odaloggers, and any combination thereof.

The use of such detector(s) can facilitate either or both of a feed forward and/or feedback approach. In a feed forwards strategy the detector can be located at position(s) upstream from the location where the odor control regime is being implemented indicating an impeding shock. They can also be set up to detect the loss of these materials elsewhere indicating a leak which will contaminate the influent to the location where the odor control regime is being implemented. In a feedback strategy the detector can be located at position(s) at or downstream from the location where the odor control regime is being implemented indicating an ongoing or previous shock. Both feedback and feed forward strategies may use detectors that allow for the remediation of an odor event before it becomes detectable to human senses.

In at least one embodiment the detector is positioned to measure the presence of a shock in evaporator condensate. In at least one embodiment the evaporator condensate is from a sugar mill.

At least one embodiment of the invention is a method and/or an apparatus for predicting/detecting and/or addressing an odor spike due to a nutrient shock in a water system. This comprises fluidly coupling a detector, a first feeding mechanism, and a second feeding mechanism to a process water stream, the detector constructed and arranged to detect the amount of nutrient in the water and to transmit information thereof to a controller device, the first feeding mechanism constructed and arranged to optionally and in variable measurements feed PAA into the water stream, the second feeding mechanism constructed and arranged to optionally and in variable measurements feed Fenton's Reagent into the water stream; the controller device configured to recognize the characteristics of a nutrient shock, and to automatically provide operational instructions to the second feeding mechanism based on those characteristics.

In at least one embodiment the controller contains information corresponding to an excess of nutrient content in the water and when supplied information from the detector it uses process logic which is constructed and arranged to cause/allow/induce the introduction of Fenton's Reagent into the water.

The controller may also be constructed and arranged to contain information corresponding to desired properties of the water including but not limited to pH, desired concentrations of PAA, Fenton's Reagent, nutrients, and/or any other material present or possibly present in the water.

At least one embodiment further comprises a Nutrient detector, PAA detector, and/or a Fenton's Reagent detector. One or more of the detectors supplies information to one or more controllers which suitably increases, decreases, and/or ceases the flow of PAA, Fenton's Reagent, and or one or more reagents suitable to neutralize PAA and or Fenton's Reagent so as to alter the water's properties to correspond with desired properties.

In at least one embodiment the controller is constructed and arranged to receive new/changed information regarding the desired characteristics of the water and it alters its response to detected water properties to correspond in accordance with the new/changed information.

EXAMPLES

The foregoing may be better understood by reference to the following examples, which are presented for purposes of illustration and are not intended to limit the scope of the invention.

A bench test was performed on various samples of sulfide laden wastewater taken from a covered pond at a food processing plant. The samples were allowed to sit for various periods of time and were treated with one of: nothing, a commercial odor suppressant (8314 sold by Nalco Company, Naperville, Ill.), and a PAA product (REDOXX 60 sold by Ecolab USA, St. Paul, Minn.). The effectiveness of these additives was measured over the time relative to when the additives were added by using a Hatch DR-890 sulfide meter to measure the sulfide ppm in the treated samples versus sulfide ppm in the untreated sample. As demonstrated in Table 1, at high dosages over long periods of time, both REDOXX and the commercial odor suppressant reduced sulfide level. However of the two, only REDOXX was effective at significantly reducing sulfide at low dosages over long periods of time. Sulfide measurement has proven to be more accurate than measurement of hydrogen sulfide in the vapor space above the water sample (which is readily diluted with the atmosphere). We know that less sulfide means less hydrogen sulfide gas/malodor.

TABLE 1

| Time Elapsed (hours:minutes) | Additive (dosage in mg/l) | Total Sulfides Measured (mg/l) | Percent reduction % |
| --- | --- | --- | --- |
| 9:45 | — | 0.33 | — |
| 9:45 | commercial 10 | 0.25 | 24% |
| 9:45 | REDOXX 10 | 0.25 | 24% |
| 13:40 | — | 1.6 | — |
| 13:40 | commercial 10 | 1.04 | 35% |
| 13:40 | REDOXX 10 | 0.62 | 61% |
| 13:40 | commercial 20 | 0.32 | 80% |
| 13:40 | REDOXX 20 | 0.16 | 90% |
| 16:25 | — | 4.6 | — |
| 16:25 | commercial 10 | 2.16 | 53% |
| 16:25 | REDOXX 10 | 1.25 | 72% |
| 16:25 | commercial 20 | 0.96 | 79% |
| 16:25 | REDOXX 20 | 0.32 | 93% |

Without being limited by a particular theory or design of the invention or of the scope afforded in construing the claims, it is believed that the peracid substantially eliminated the SRP population at low dosages so it was effective at low dosages. In contrast the commercial quaternary ammonium odor suppressant only worked on the sulfides after the SRPs produced them so over time as the SRP population increased, the commercial product was less effective. This can be seen in Table 2 which compares the overall populations of microorganisms measured with PCR within samples after various additives have been present for periods of time.

TABLE 2

| Time Elapsed (hours) | Additive Name (amount) | Total bacteria per mL** | Bacteria % change | SRBs per mL | Archaea per mL | Archaea % change |
| --- | --- | --- | --- | --- | --- | --- |
| 0 | Commercial 1200 ppm | 5,680,630,503 | — | <LOD* | 98,612 | — |
| 4 | Commercial 1200 ppm | 13,835,308,772 | +160% | <LOD* | 103,101 | +4% |
| 0 | REDOXX 60 1000 ppm | 21,120,497,248 | — | <LOD* | 1,170,753 | — |
| 3.5 | REDOXX 60 1000 ppm | 1,079,650,145 | −95% | <LOD* | 19,915 | −99% |

*Below the detection limit of the assay

Table 2 demonstrates that the peracid and the commercial odor suppressant operate very differently. Over time in the presence of the commercial product, there is exponential growth of bacteria while archaea population remains stable. This indicates that it is doing nothing to the underlying microbial population and is merely compensating for the actions of the SRP. In contrast the peracid treated sample drastically undergoes a reduction in the populations of both archaea and bacteria but at different rates. This indicates that peracid can be dosed to preferentially target one organism (such as SRP) while not eliminating another organism (such as waste consuming organisms).

This principle can be seen in FIG. 1. There it is shown that the release of DMDS sulfide gas is relative to the bacteria population not the mold population. (SRP are rarely if ever molds but many bacteria are SRP). As a result, adding a PAA dosage that drastically eliminates bacteria but is substantially harmless to molds will effect a large reduction in odor release.

Table 3 provides an illustration of fine tuning a peracid dosage relative to PAA demand. In this table it was predetermined that overall peracid demand for the specific sample was 600 ppm. As increasing dosages of peracid are added the overall active ATP count will drop because it is imposing ever harsher conditions. These conditions however affect various organisms differently and can be used to determine a SRP PAA demand which is lower than the aerobic PAA demand.

TABLE 3

| Peracid added (ppm) | Total Active ATP | % Reduction |
| --- | --- | --- |
| 0 | 3181 | — |
| 60 | 2145 | 32.6% |
| 90 | 1581 | 50.3% |
| 120 | 965 | 69.7% |
| 600 | — | 100% |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by volume unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of reducing the odor released by a wastewater treatment system while preserving the vitality of wastewater-treating and waste-consuming microorganisms within the system, the method comprising the steps of:
    continuously adding to a process flow of water a composition in an amount such that it is in excess of the SRP PAA demand but is below the aerobic PAA demand,
    detecting a sudden surge in nutrient content in the process flow of water,
    in response to the detected surge adding an effective amount of Fenton's Reagent to the flow,
    wherein the composition comprises at least one peroxy acid.

2. The method of claim 1 in which the Fenton's Reagent is added before there is a detectable change in the population of microorganisms in the wastewater treatment system.

3. The method of claim 1 in which the Fenton's Reagent is added before the nutrient surge reaches the wastewater treatment system.

4. The method of claim 1 in which the Fenton's Reagent is added after there is a noticeable increase in odor.

5. The method of claim 1 in which the amount of continuously added composition is not altered in response to the sudden surge in nutrient content.

6. The method of claim 1 in which the surge in nutrient content is detected by measuring fluorescence from the nutrient.

7. The method of claim 1 in which the surge in nutrient content is detected by measuring fluorescence from the nutrient in response to a first excitation light source having a wavelength of 320 nm and a second excitation light source having a wavelength of 406 nm.

8. The method of claim 1 in which the nutrient is one or more sugars.

9. The method of claim 1 in which the process flow is condensate from a boiler in a sugar mill.

10. The method of claim 1 wherein the composition eliminates at least one biofilm layer on at least one surface of the wastewater treatment system and the lack of said biofilm layer prevents the localization against that surface of at least one of: $H_2S$, a biogenic acid, a corrosive biogenic material, and any combination thereof.

11. The method of claim 1 wherein the composition comprises PAA.

12. The method of claim 1 wherein the composition is added in an amount lower than a quaternary ammonium odor suppressant but is more than 10% effective than said quaternary ammonium odor suppressant would be at suppressing sulfide odor release.

13. The method of claim 1 wherein the aerobic PAA demand of the system is determined by measuring the minimum ppm amount of composition that needs to be added to cause substantially no less than a 98% drop in total active ATP in the wastewater.

14. The method of claim 1 excluding the presence of an odor suppressing co-ingredient which neutralizes the innate odor of the peroxy acid.

15. The method of claim 1 in which the composition is fed directly into a portion of the wastewater system selected from the group consisting of: a wastewater pond, an EQ tank, a wastewater storage tank, and any combination thereof.

16. The method of claim 1 in which the composition is fed directly into one item selected from the group consisting of: a trunk line which feeds wastewater into a storage vessel, a stationary water system, a recirculating water system, and any combination thereof.

17. The method of claim 1 in which the composition is fed directly into a covered pond and the composition reduces the amount of sulfide acid corrosion by more than 10% than if the composition were not added to the pond.

18. The method of claim 1 in which the composition reduces oxygen demand of the wastewater.

19. The method of claim 1 in which the peracid is a reaction product between a peroxygen source other than hydrogen peroxide with a peracetic acid.

* * * * *